United States Patent [19]

Tran et al.

[11] Patent Number: 4,830,885

[45] Date of Patent: May 16, 1989

[54] CHLORINE-RESISTANT SEMIPERMEABLE MEMBRANES

[75] Inventors: Chinh N. Tran; Hong C. Chu; William G. Light, all of San Diego, Calif.

[73] Assignee: Allied-Signal Inc., Morristown, N.J.

[21] Appl. No.: 59,295

[22] Filed: Jun. 8, 1987

[51] Int. Cl.$^4$ .............................................. B05D 5/00
[52] U.S. Cl. ............................ 427/245; 210/500.33; 210/500.37; 210/500.38; 210/500.41; 427/341; 428/420
[58] Field of Search .................. 210/639, 490, 500.28, 210/500.37, 500.38, 500.41, 500.33; 264/41, 45.5; 427/244, 245, 341, 342, 340; 428/420

[56] References Cited

U.S. PATENT DOCUMENTS

| | | | |
|---|---|---|---|
| 3,260,691 | 7/1966 | Lavin et al. | 260/30.2 |
| 3,480,588 | 11/1969 | Lavin et al. | 260/47 |
| 3,567,632 | 3/1971 | Richter et al. | 210/23 |
| 3,600,350 | 8/1971 | Kwolek | 260/32.6 |
| 3,710,945 | 1/1973 | Dismore | 210/321 |
| 3,878,109 | 4/1975 | Ikeda et al. | 210/500 M |
| 3,904,519 | 9/1975 | McKinney, Jr. et al. | 210/23 |
| 3,920,612 | 11/1975 | Stephens | 260/47 CP |
| 3,951,815 | 4/1976 | Wrasidlo | 210/500 M |
| 3,993,625 | 11/1976 | Kurihara et al. | 260/47 CP |
| 4,048,144 | 9/1977 | Stephens | 260/47 CP |
| 4,265,745 | 5/1981 | Kawaguchi et al. | 210/654 |
| 4,277,344 | 7/1981 | Cadotte | 210/654 |
| 4,567,009 | 1/1986 | Badenhop et al. | 210/500.28 |
| 4,606,943 | 8/1986 | Rak et al. | 210/500.28 |
| 4,626,468 | 12/1986 | Sundet | 428/420 |
| 4,634,531 | 1/1987 | Nakagawa et al. | 210/639 |
| 4,661,254 | 4/1987 | Zupancic et al. | 210/500.38 |
| 4,690,766 | 9/1987 | Linder et al. | 210/500.28 |

*Primary Examiner*—Peter Hruskoci
*Attorney, Agent, or Firm*—Harold N. Wells; Thomas K. McBride; Raymond H. Nelson

[57] ABSTRACT

Chlorine-resistant semipermeable membranes which comprise an interfacial polymerized reaction product composite on a porous support backing material may be prepared by contacting a porous support material such as polysulfone with an aqueous solution of an aromatic polyamine, said aqueous solution containing a polyhydric compound and an acid acceptor. The coated support material is then contacted with an organic solvent solution of an aromatic polycarboxylic acid halide for a period of time sufficient to form an interfacial polymerized reaction product on the surface of the support material. The resulting composite is then post treated by washing with an alkaline compound, leaching with sodium bisulfite and treating the leached composite with a polyhydric compound. The resultant membrane composite may be used in separation processes such as the desalination of brackish or sea water, the membrane being resistant to attack by chlorine which is present in the water.

32 Claims, No Drawings

CHLORINE-RESISTANT SEMIPERMEABLE MEMBRANES

BACKGROUND OF THE INVENTION

The separation of various components found in liquids or gases may be effected in a multitude of processes, the techniques for effecting the separation utilizing asymmetric or composite membranes including selective permeation, ultrafiltration or reverse osmosis. A particular example of the latter type of separation involves a desalination process in which water which is rendered potable or suitable for other purposes is obtained from sea water, contaminated water, brackish water or brine. This process is of especial value in areas of the world where the water found in the area is brackish or is saline in nature. The desalination of this water is necessary in order to provide large amounts of potable or relatively nonsalty water for industrial, agricultural or home use. The desalination of the water is effected by forcing the water through a reverse osmosis membrane whereby the purified water is passed through the membrane and recovered, while the contaminants or salts do not pass through the membrane, thus, in effect, being rejected by the membrane and recovered as the retentate.

A reverse osmosis membrane, in order to be utilized for such a purpose, must possess certain characteristics applicable to the process. For example, the membrane must have a very high salt rejection coefficient. In addition, another important characteristic and a problem which must be addressed when utilizing the membrane, is the ability of the membrane to be resistant to chlorine attack. Another important factor which is present in the use of a reverse osmosis membrane is that said membrane also possess a high flux characteristic, that is, the ability to pass a relatively large amount of water through the membrane at relatively low pressures. If a membrane possesses these desirable characteristics, it will be commercially feasible in its applicability to the desalination process.

Reverse osmosis membranes have been prepared and used from a wide variety of known polymeric materials. While many of these polymeric materials possess the ability of reducing the concentration of a solute to where the salt rejection capability is in excess of 98%, some do not possess the necessary flux rate whereby the volume of water which is required to be produced by the membrane per unit of membrane surface is sufficient for the application of the technology.

As was hereinbefore set forth, many prior U.S. patents describe various membranes which are useful in desalination processes. For example, U.S. Pat. Nos. 3,567,632, 3,600,350, 3,710,945, 3,878,109, 3,904,519, 3,920,612, 3,951,815, 3,993,625 and 4,048,144 illustrate various semipermeable membranes prepared from polyamides. Likewise, U.S. Pat. Nos. 3,260,691 and 3,480,588 disclose coating compositions which are obtained from the condensation products of aromatic primary diamines and aromatic tricarboxylic acid derivatives.

Inasmuch as the semipermeable membrane which is used for the desalination process should be relatively thin in nature in order to provide a desirable flux rate, it is necessary, in many instances, that the reverse osmosis membrane be composited or laminated on a porous backing support material. This porous support backing material should in itself possess certain characteristics which make it desirable for such a use. For example, the porous support material should possess pore sizes which are sufficiently large enough so that the water or permeate can pass through the support without affecting or lessening the flux rate of the entire composite. Conversely speaking, the pore size should not be large enough so that the thin composite semipermeable membrane will tend to fill up or penetrate too far into the pores, thus distorting the shape of the thin film membrane with the attendant possibility of rupturing the membrane when operated under high pressure, thus causing said membrane to lose its effectiveness in the reverse osmosis process.

In addition to the aforementioned U.S. patents, another U.S. patent, namely U.S. Pat. No. 4,277,344, discloses an interfacial synthesized reverse osmosis membrane. This membrane is prepared from an interfacially polymerized aromatic polyamine which has been prepared from an essentially monomeric polyacyl halide and an essentially monomeric arylene polyamine. The composite membrane is prepared by coating a support material with a liquid layer comprising an aqueous solution containing the polyamine reactant, contacting the liquid layer with essentially monomeric volatilizable polyfunctional acyl halide dissolved in a liquid aliphatic or liquid halogenated aliphatic solvent and drying the product formed thereby to form the desired membrane. In addition, the membrane may then be treated with an oxidizing agent and chlorine or a chlorine releasing agent to improve its chlorine resistance. The patent teaches that the membrane contains a plurality of sites having the formula:

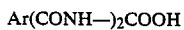

$$Ar(CONH-)_2COOH$$

in which Ar represents the aromatic nucleus residue of the polyfunctional aryl halide. In addition, the membrane is described as being lightly cross-linked in nature. The reaction is effected in the absence of any surface active agents and acid acceptors, the patentee stating that these compounds do not appear to provide any advantages in the context of the invention and that it is preferred to carry out the interfacial polymerization without the presence of surface active agents or acid acceptors.

Furthermore, the structure of the membrane will be dependent upon the water provided for in the aqueous solution to serve as a reactant and states that the aryl halide groups on the polyfunctional aryl halide are in a competitive state during the reaction with the aqueous solution of the polyamine. The patentee theorizes that the acyl halide groups can react either with water or with the primary amine groups or conversely that a sequential reaction occurs in which hydrolysis precedes condensation with an amine group.

SUMMARY OF THE INVENTION

This invention relates to composite membranes comprising of a permselective barrier on a porous support. More specifically, the invention is concerned with membranes which exhibit an extensive resistance to chlorine and oxidants degradation, a superior degree of solvent permeation rate and a superior degree of solute rejection.

As was previously discussed, the use of membranes for the separation of gas from a gaseous mixture, liquid from liquid mixture, gas from liquid mixture or solids from liquids are important articles of commerce. This is especially true in the area of separation whereby water which is brackish or saline in nature or having other solid and/or organic materials dissolved therein may be rendered potable or suitable for use in other industrial or agricultural regions by passing the water through separation (permselective) membranes. The particular membranes which constitute the inventive feature of the present application will comprise the reaction product resulting from the reaction of an aromatic polyamine and an aromatic polycarboxylic acid chloride, said membrane being composited or coated on a porous support backing material. By utilizing these membranes in a separating (desalination) process, it is possible to treat water source over a relatively long period of time without replacement of the membrane, the long life of the membrane being, in part, due to the resistance to degradation resulting from exposure to chlorine or other oxidizing agents are present in the water source.

It is therefore an object of this invention to provide a composite membrane, suitable for use in separation processes, which possesses desirable characteristics.

A further object of this invention is to provide a process for preparing a semipermeable membrane which is resistant to chlorine and other oxidizing agents, thus rendering the membrane suitable for use in separation processes such as desalination of water where chlorine or other oxidizing agents are present in an amount sufficient to degrade other types of membranes.

In one aspect, an embodiment of this invention resides in a chlorine-resistant semipermeable membrane prepared by casting an aqueous solution of an aromatic polyamine which contains a polyhydric compound on a porous support backing material, removing excess solution, contacting the coated porous support material with an organic solvent solution of an aromatic polycarboxylic acid halide to form an interfacial condensation reaction product on the surface of said porous support material, curing the resultant composite at curing conditions to form said chlorine-resistant semipermeable membrane.

A further embodiment of this invention is found in a process for the preparation of a chlorine-resistant semipermeable membrane which comprises casting an aqueous solution of an aromatic polyamine which contains a polyhydric compound and an acid acceptor on a porous support backing material, removing excess solution, contacting the coated porous support material with an organic solvent solution of an aromatic polycarboxylic acid halide to form an interfacial condensation reaction product on the surface of said porous support material, curing the resultant composite at curing conditions, washing the cured membrane with an alkaline compound at an elevated temperature and pH, leaching the washed composite at an elevated temperature with sodium bisulfite, treating the leached composite with a polyhydric compound, and recovering the resultant chlorine-resistant semipermeable membrane.

A specific embodiment of this invention is found in a chlorine-resistant semipermeable membrane prepared by casting an aqueous solution of m-phenylenediamine, said aqueous solution containing ethylene glycol and sodium carbonate on a polysulfone backing material, removing excess solution, contacting the coated polysulfone with a naphtha solution of trimesoyl chloride, curing the resultant composite at a temperature in the range of from about 20° to about 150° C. for a period of time in the range of from about 10 minutes to about 2 hours, subjecting the composite to treatment with sodium carbonate at a temperature in the range of from about 20° to about 100° C. at a pH in the range of from about 9 to about 11, leaching the treated membrane with sodium bisulfite at a temperature in the range of from about 20° to about 100° C. The leached membrane can be further treated with glycerine, or heat at 20°–100° C.

Other objects and embodiments will be found in the following further detailed description of the invention.

DETAILED DESCRIPTION OF THE INVENTION

As hereinbefore set forth, the present invention is concerned with semipermeable membranes which are resistant to chlorine and to a method for preparing these membranes. The membranes are prepared by casting an aqueous solution of an aromatic polyamine on a porous backing support material, removing excess solution by drawing, rolling, sponging, air knifing or other suitable techniques, and thereafter contacting the coated support material with an organic solvent solution of an aromatic polycarboxylic acid halide. The organic solvent which is used to prepare this solution of the aromatic polycarboxylic acid halide is immiscible or sparingly miscible with the aqueous solution, thus permitting the formation of an interfacial polymerized condensation reaction product onto the surface of the support material. The resulting composite is then cured to provide a semipermeable membrane which exhibits favorable characteristics with respect to salt rejection and flux as well as resistance to chlorine.

As was previously discussed, a membrane of this type is set forth in U.S. Pat. No. 4,277,344. This membrane was described as containing a plurality of sites having the formula:

Ar(CONH—)$_2$COOH in which Ar represents the aromatic nucleus residue of the polyfunctional aryl halide utilized as one component thereof. It has now been discovered that by utilizing an aromatic polyamine in an aqueous solvent solution which contains a polyhydric compound and an acid acceptor in which the pH of the aqueous solution is kept in a range of from about 9 to about 11 will, when contacted with an organic solvent solution of an aromatic polycarboxylic acid halide, result in the formation of a membrane which exhibits superior performances in term of permeation rate and separation characteristics over the membranes made according to the teaching of U.S. Pat. No. 4,277,344 which did not utilize polyhydric compounds. An additional difference between the membrane of the present invention and the membrane of U.S. Pat. No. 4,277,344, is that due to the high pH of the reaction medium and use of an acid acceptor, any COOH units will be present in the salt form as carboxylates rather than undissociated carboxylic acid forms.

In one embodiment, the chlorine resistant semipermeable membranes of the present invention may be prepared by coating a porous support backing material with an aqueous solution of the aromatic polyamine, said aqueous solution being of a composition hereafter set forth in greater detail. The porous support backing material comprises a polymeric material containing pore sizes which are of sufficient size to permit the passage of permeate therethrough, but are not large enough so as to interfere with the bridging over of the resulting ultrathin reverse osmosis membrane. In the preferred embodiment of the invention, the pore size of the porous support backing material will range from about 1 to about 5,000 millimicrons inasmuch as pores which are larger in diameter than 5,000 millimicrons will permit the ultrathin reverse osmosis membrane to sag into the pore, thus disrupting the flat sheet configuration which is a desirable characteristic of the membrane. Examples of porous support backing materials which may be used to prepare the desired membrane composite of the present invention will include such polymers as polysulfone, polycarbonate, microporous polypropylene, the various polyamides, polyimines, polyphenylene ether, various halogenated polymers such as polyvinylidine fluoride, etc.

The porous support backing material may be coated utilizing either a hand coating or continuous operation with an aqueous solution of monomeric polyamines or to render the resulting membrane more resistant to environmental attacks, of monomeric substituted polyamines. These monomeric polyamines may comprise cyclic polyamines such as piperazine, etc.; substituted cyclic polyamines such as methyl piperazine, dimethyl piperazine, etc.; aromatic polyamines such as m-phenylenediamine, o-phenylenediamine, p-phenylenediamine, etc.; substituted aromatic polyamines such as chlorophenylenediamine, N,N'dimethyl-1,3 phenylenediamine, etc.; multi-aromatic ring polyamines such as benzidine, etc.; substituted multi-aromatic ring polyamines such as 3,3'dimethylbenzidine, 3,3'dichlorobenzidine, etc.; or a mixture thereof depending on the separation requirements as well as the environmental stability requirements of the resulting membranes. The solution which is utilized as the carrier for the aromatic polyamine will comprise water in which the aromatic polyamine will be present in the solution in an amount in the range of from about 0.1 to about 5% by weight of the solution. Another component of the aqueous solution will include polyhydric compounds such as ethylene glycol, propylene glycol, glycerine, other longer carbon atom backbone glycols, i.e. ($C_4$–$C_{12}$), polyethylene glycol, polypropylene glycol, copolymers of ethylene glycol and propylene glycol, etc. used singly or mixed with each other. The aqueous solution may also contain basic acid acceptors such as sodium hydroxide, potassium hydroxide, sodium carbonate, potassium carbonate, etc. The polyhydric compound may be present in the aqueous solution in amounts ranging from about 5 to about 90% while the acid acceptor may be present in a relatively small amount ranging from about 5 to about 500 parts per million. Furthermore, the pH of the aqueous solution is maintained in a relatively high range of from about 9 to 11.

After coating the porous support backing material with the aqueous solution of the aromatic polyamine, the excess solution is removed by suitable techniques previously discussed and the coated support material is then contacted with an organic solvent solution of the aromatic polycarboxylic acid halide. Examples of aromatic polycarboxylic acid halides which may be employed will include di- or tricarboxylic acid halides such as trimesoyl chloride (1,3,5-benzene tricarboxylic acid chloride), isophthaloyl chloride, terephthaloyl chloride, trimesoyl bromide (1,3,5-benzene tricarboxylic acid bromide), isophthaloyl bromide, terephthaloyl bromide, trimesoyl iodide (1,3,5-benzene tricarboxylic acid iodide), isophthaloyl iodide, terephthaloyl iodide, as well as mixtures of di-tri, tri-tri carboxylic acid halides, that is, trimesoyl halide and the isomeric phthaloyl halides. The di- or tricarboxylic acid halides may be substituted to render them more resistant to further environmental attack. Again, in the preferred embodiment of the invention, the aromatic polycarboxylic acid halide is present in the organic solvent solution in a range of from about 0.01 to about 5% by weight of the solution. The organic solvents which are employed in the process of this invention will comprise those which are immiscible with water, immiscible or sparingly miscible with polyhydric compounds and may comprise paraffins such as n-pentane, n-hexane, n-heptane, cyclopentane, cyclohexane, methylcyclopentane, naphtha, etc. or halogenated hydrocarbon such as the freon series or class of halogenated solvents. It is to be understood that the above listing of polyhydric compounds, acid acceptors, aromatic substituted and unsubstituted polyamines, aromatic polycarboxylic acid halides and organic solvents are only representative of the class of compounds which may be employed, and that the present invention is not necessarily limited thereto.

Inasmuch as the organic solvent and the aqueous solvent mixture for the aromatic polyamine are substantially immiscible or incompatible, the polymerization of the two components of the membrane will occur substantially only at the interface between the solvent phases and thus an interfacially polymerized reaction product comprising a thin film membrane will be formed thereat. The contact time required for the formation of the thin film membrane will fluctuate over a relatively wide range of from about 1 second to about 60 seconds. Following the formation of the interfacially polymerized reaction product on the surface of the porous support backing material, the resultant composite may be cured to remove any remaining solvent and reactants and firmly affix the thin film membrane on the surface of the support. The curing of the composite membrane may be effected over a wide temperature range, said temperature being from ambient (20°–25° C.) up to about 150° C. for a period of time ranging from about 1 minute to about 2 hours or more in duration. The operating parameters of time and temperature will be interdependent, the primary criteria for the curing of the membrane being that said curing time is sufficient to provide the desired membrane but being insufficient to affect the desired characteristics of the thin film membrane and the porous backing support material. For example, excessive heat or curing time may affect the pore size of the backing material, thus resulting in a decrease of the desired flux rate of the membrane.

The composite of chlorine-resistant membrane is then subjected to a post treatment in which the membrane is subjected to a wash utilizing an aqueous solution of a basic material at a pH in the range of from about 9 to about 11. The basicity of the solution is afforded by the presence of a basic compound such as sodium hydroxide, potassium hydroxide, lithium hydroxide, sodium carbonate, potassium carbonate, lithium carbonate, etc. The wash is effected at a temperature which may be in the range of from about 20° to about 100° C. for a period of time in the range of from about 1 to about 15 minutes.

Following the wash of the membrane, it is then subjected to a leaching step in which any unreacted aromatic polyamine which may still be present on the membrane will be removed. The removal of the polyamine is effected inasmuch as the amine may tend to oxidize and discolor the membrane as well as causing a subsequent handling problem of the membrane downstream in the equipment. The leaching of the unreacted aromatic polyamine is effected by treating said membrane with a substance such as sodium bisulfite at a temperature in the range of from about 20° to about 100° C. again for a period of time in the range of from about 1 to about 5 minutes. In the preferred embodiment of the invention the sodium bisulfite is present in the leached solution in a range of from about 0.5 to about 1%. Additional leaching substances which may be utilized will include organic acids such as sulfamic acid or mineral acids such as nitric acid, etc.

Following the leaching treatment, the chlorine-resistant semipermeable membrane is then further treated with a polyhydric compound such as glycerine which may be present in a range of from about 10 to about 50% V/V in order to protect the thin film membrane from damage in handling as well as preventing the membrane from drying out, the latter leading to a loss of performance of the membrane when used in a separation process.

It is contemplated within the scope of this invention that chlorine-resistant semipermeable membranes may be prepared in a continuous manner of operation. When this type of operation is employed, a porous support backing material of the type hereinbefore set forth in greater detail is continuously passed through a bath of an aqueous solution of the aromatic polyamine which contains the polyhydric compound and acid acceptor. After passage through the bath, the backing material is continuously withdrawn and the excess solution which may be present is removed by suitable techniques. The coated support material is then also continuously passed through the organic solvent solution of the aromatic polycarboxylic acid halide. The interfacial polymerization reaction will occur during the contact time by the solutions following which the composite comprising the interfacial polymerized reaction product in the form of a thin film semipermeable membrane on the surface of the porous support backing material will then be cured as, for example, by passage through an oven which is maintained at the desired curing temperature, the passage through said oven being at a predetermined rate so as to avoid any possible damage to the composite membrane. Thereafter, the membrane is continuously withdrawn from the curing oven and continuously passed through the washing, leaching and coating zones for the post treatment, and the desired membrane is subsequently recovered.

The resultant chlorine-resistant semipermeable membrane may then be employed for the separation process desired such as the desalination of sea water or brackish water, other treatments of water such as softening of hard water whereby salts are removed, boiling said water treatment, concentration of whey or fruit juices, etc. The membranes which are in the form of flat sheets are particularly applicable for use in modules either in single sheet or multiple sheet units whereby the sheet or sheets are wound in a spiral type configuration.

The following examples are given for purposes of illustrating the novel chlorine-resistant semipermeable membranes which have been prepared according to the process hereinbefore set forth and to the use thereof as separation agents. However, it is to be understood that these examples are provided merely for purposes of illustration and that the present invention is not necessarily limited thereto.

EXAMPLE I

A chlorine-resistant semipermeable membrane was prepared by passing a sheet of porous polysulfone through an aqueous solution containing 2% by weight of m-phenylenediamine, 70 ppm of sodium carbonate and 5% by volume of ethylene glycol. The polysulfone sheet was in contact with the solution which had a pH of 9.85 for a period of 30 seconds. The membrane now loaded with aqueous solution mixture was air dried at room temperature for a period of 15 minutes and thereafter was passed through a naphtha solution containing 0.15% by weight of trimesoyl chloride for a period of 15 seconds. The membrane composite was then dried at a temperature of 71° F. in air for a period of 23 minutes.

The post treatment of the membrane was effected by washing the membrane with a sodium carbonate solution which had a pH of 10.0 for a period of 5 minutes at room temperature. The leaching step of the post treatment was effected by treating the membrane with a sodium bisulfite solution for a period of 5 minutes at a temperature of 40° C. Finally the membrane was coated with a 20% solution of glycerine. This membrane was designated as membrane A.

EXAMPLE II

A second membrane was prepared in a manner similar to that set forth in Example I above by passing a sheet of polysulfone through an aqueous solution of m-phenylenediamine which was present in an amount of 2.1% by weight, said solution containing 70 ppm of sodium carbonate and 20% by volume of ethylene glycol, the pH of the solution being maintained at 9.4. The polysulfone was contacted with this solution for a period of 30 seconds following which it was withdrawn and the excess solution was removed in a manner similar to that set forth above. The coated polysulfone was then passed through a solution of 0.1% by weight of trimesoyl chloride in naphtha for a period of 15 seconds and thereafter dried at a temperature of 71° F. in a forced air atmosphere for a period of 20 minutes.

The resultant membrane was post treated by rinsing with a sodium carbonate solution at room temperature for a period of 5 minutes, the pH of the solution being 10.0. Following this, the residual m-phenylenediamine was removed by treatment with a sodium bisulfite solution at a temperature of 40° C. for a period of 5 minutes and thereafter coated with a glycerine solution. This membrane was designated as membrane B.

EXAMPLE III

A third membrane was also prepared by passing a sheet of polysulfone through an aqueous solution of m-phenylenediamine, said polyamine being present in an amount of 2.1% by weight, the aqueous solution containing 70 ppm of sodium carbonate and 50% by volume of ethylene glycol. The coated polysulfone was treated in a manner similar to that set forth above, that is, by being passed through a naphtha solution containing 0.15% by weight of trimesoyl chloride under identical conditions. The post treatment of the resultant membrane was also similar to that described above and this membrane was designated as membrane C.

EXAMPLE IV

For comparative results, a like membrane was prepared with the exception that the aqueous solution did not contain any ethylene glycol, being 100% aqueous by nature. The remainder of the process was identical to that described above and the resultant membrane after post treatment was designated a membrane D.

EXAMPLE V

Again for comparative results, two membranes were prepared according to the method set forth in U.S. Pat. No. 4,277,344. The first membrane was prepared by passing a sheet of polysulfone through an aqueous solution containing 2.0% by weight of m-phenylenediamine for a period of 36 seconds. The coated polysulfone sheet was removed, the excess solution was also removed and the coated sheet passed through an organic solution of trichlorotrifluoroethane containing 0.1% weight per volume of trimesoyl chloride for a period of 10 seconds. The membrane was dried in air at a temperature of 74° F.

A second membrane was also prepared according to the above paragraph and after drying with air was treated with a solution containing 100 ppm of hypochlorite for a period of 20 hours at room temperature and recovered. The first membrane in this example was designated membrane E and the second as membrane F.

EXAMPLE VI

The membranes which were prepared according to the above examples were placed in a cell and a synthetic brackish water feed containing 2 g/liter of sodium chloride was passed across the surface of a membrane at a feed flow rate of 1.5 gallons/minute. The test conditions which were employed during the experiments included a pressure of 220 pounds per square inch gauge (psig) on one side of the membrane while the other side of the membrane was maintained at atmospheric pressure. A temperature of 25° C. was maintained throughout the experiment while keeping the pH of the feed at 5.5. The permeate, which was collected from the flowthrough, was measured and the rejection of sodium chloride and flux rate were determined. The results of these tests are set forth in the table below.

TABLE

| Membrane | D | A | B | C | E | F |
|---|---|---|---|---|---|---|
| Flux (gfd) | 22.8 | 26.7 | 33.0 | 32.4 | 21.7 | 25.84 |
| Rejection (%) | 98.5 | 98.6 | 98.7 | 95.3 | 96.3 | 95.99 |

It is to be noted from the above table that the membranes which were prepared according to the present invention utilizing ethylene glycol and sodium carbonate in the aqueous solution as well as a post treatment of the type set forth in greater detail in the above examples exhibited higher flux rates with comparable or greater salt rejections than were found when utilizing membranes which had been prepared according to U.S. Pat. No. 4,277,344 or without the presence of ethylene glycol in the aqueous solution.

We claim as our invention:

1. A chlorine-resistant semipermeable membrane prepared by casting an aqueous solution of an aromatic polyamine which contains a polyhydric compound on a porous support backing material, removing excess solution, contacting the coated porous support material with an organic solvent solution of an aromatic polycarboxylic acid halide to form an interfacial condensation reaction product on the surface of said porous support material, curing the resultant composite at curing conditions including a temperature in the range of about 20° to 150° C. for a period of time ranging from about 10 minutes to about 2 hours to form said chlorine-resistant semipermeable membrane, washing the cured membrane with an alkaline compound at a pH of from about 9 to about 11, and leaching the washed composite with sodium bisulfite, said aromatic polyamine selected from the group consisting of piperazine, substituted piperazine, phenylenediamine, substituted phenylenediamine, benzidine, substituted benzidine and mixtures thereof, said aromatic polycarboxylic acid halide selected from the group consisting of dicarboxylic acid halides and tricarboxylic acid halides and mixtures thereof, and said polyhydric compound selected from the group consisting of ethylene glycol, propylene glycol, glycerine, polyethylene glycol, polypropylene glycol, copolymers of ethylene glycol and propylene glycol, backbone glycols having from 4 to 12 carbon atoms, and mixtures thereof.

2. The chlorine-resistant semipermeable membrane as set forth in claim 1 in which said aromatic polyamine comprises m-phenylenediamine.

3. The chlorine-resistant semipermeable membrane as set forth in claim 1 in which said aromatic polyamine comprises 4-chlorophenylenediamine.

4. The chlorine-resistant semipermeable membrane as set forth in claim 1 in which said aromatic polyamine comprises 5-chlorophenylenediamine.

5. The chlorine-resistant semipermeable membrane as set forth in claim 1 in which said aromatic polyamine comprises a mixture of m-phenylenediamine and 4-chlorophenylenediamine.

6. The chlorine-resistant semipermeable membrane as set forth in claim 1 in which said aromatic polycarboxylic acid halide comprises isophthaloyl chloride.

7. The chlorine-resistant semipermeable membrane as set forth in claim 1 in which said aromatic polycarboxylic acid halide comprises trimesoyl chloride.

8. The chlorine-resistant semipermeable membrane as set forth in claim 1 in which said aromatic polycarboxylic acid halide comprises terephthaloyl chloride.

9. The chlorine-resistant semipermeable membrane as set forth in claim 1 in which said polyhydric compound comprises ethylene glycol.

10. The chlorine-resistant semipermeable membrane as set forth in claim 1 in which said polyhydric compound comprises glycerine.

11. The chlorine-resistant semipermeable membrane as set forth in claim 1 in which said polyhydric compound comprises propylene glycol.

12. The chlorine-resistant semipermeable membrane as set forth in claim 1 in which said polyhydric compound comprises polyethylene glycol.

13. The chlorine-resistant semipermeable membrane as set forth in claim 1 further characterized in that said aqueous solution contains an acid acceptor.

14. The chlorine-resistant semipermeable membrane as set forth in claim 13 in which said acid acceptor comprises sodium carbonate.

15. The chlorine-resistant semipermeable membrane as set forth in claim 13 in which said acid acceptor comprises potassium carbonate.

16. The chlorine-resistant semipermeable membrane as set forth in claim 1 in which the pH of said aqueous solution is in a range of from about 9 to about 11.

17. The chlorine-resistant semipermeable membrane as set forth in claim 1 in which said alkaline compound comprises sodium carbonate.

18. The chlorine-resistant semipermeable membrane as set forth in claim 1 in which the cured membrane is washed at a temperature in a range of from about 20° C. to about 100° C.

19. The chlorine-resistant semipermeable membrane as set forth in claim 1 in which said chlorine-resistant semipermeable membrane is further treated with a polyhydric compound subsequent to said leaching treatment to form a coating on said membrane.

20. The chlorine-resistant semipermeable membrane as set forth in claim 19 in which said polyhydric compound comprises glycerine.

21. A process for the preparation of a chlorine-resistant semipermeable membrane which comprises casting an aqueous solution of an aromatic polyamine which contains a polyhydric compound and an acid acceptor on a porous support backing material, removing excess solution, contacting the coated porous support material with an organic solvent solution of an aromatic polycarboxylic acid halide to form an interfacial condensation reaction product on the surface of said porous support material, curing the resultant composite at curing conditions including a temperature in the range of about 20° to 150° C. for a period of time ranging from about 10 minutes to about 2 hours, washing the cured membrane with an alkaline compound at a pH of from about 9 to about 11, leaching the washed composite with sodium bisulfite, treating the leached composite with a polyhydric compound, and recovering the resultant chlorine-resistant semipermeable membrane, said aromatic polyamine selected from the group consisting of piperazine, substituted piperazine, phenylenediamine, substituted phenylenediamine, benzidine, substituted benzidine and mixtures thereof, said aromatic polycarboxylic acid halide selected from the group consisting of dicarboxylic acid halides and tricarboxylic acid halides and mixtures thereof, and said polyhydric compound selected from the group consisting of ethylene glycol, propylene glycol, glycerine, polyethylene glycol, polypropylene glycol, copolymers of ethylene glycol and propylene glycol, backbone glycols having from 4 to 12 carbon atoms and mixtures thereof.

22. The process as set forth in claim 21 in which said aromatic polyamine comprises m-phenylenediamine.

23. The process as set forth in claim 21 in which said aromatic polyamine comprises 4-chlorophenylenediamine.

24. The process as set forth in claim 21 in which said aromatic polyamine comprises 5-chlorophenylenediamine.

25. The process as set forth in claim 21 in which said aromatic polyamine comprises a mixture of m-phenylenediamine and 4-chlorophenylenediamine.

26. The process as set forth in claim 21 in which said aromatic polycarboxylic acid halide comprises isophthaloyl chloride.

27. The process as set forth in claim 21 in which said aromatic polycarboxylic acid halide comprises trimesoyl chloride.

28. The process as set forth in claim 21 in which said aromatic polycarboxylic acid halide comprises terephthaloyl chloride.

29. The process as set forth in claim 21 in which said acid acceptor comprises sodium carbonate.

30. The process as set forth in claim 21 in which said composite is washed at a temperature in the range of from about 20° C. to about 100° C.

31. The process as set forth in claim 21 in which said composite is leached at a temperature in the range of from about 20° C. to about 100° C.

32. The process as set forth in claim 21 in which the polyhydric compound utilized to treat the leached composite is glycerine.

* * * * *